US012767996B2

(12) United States Patent
Miwa et al.

(10) Patent No.: US 12,767,996 B2
(45) Date of Patent: Oct. 20, 2026

(54) METHOD FOR PRODUCING MOLTEN IRON USING ELECTRIC FURNACE PROVIDED WITH VIDEO DEVICE

(71) Applicant: JFE STEEL CORPORATION, Tokyo (JP)

(72) Inventors: Yoshihiro Miwa, Tokyo (JP); Koichi Tsutsumi, Tokyo (JP); Goro Okuyama, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 555 days.

(21) Appl. No.: 18/264,249

(22) PCT Filed: Jan. 27, 2022

(86) PCT No.: PCT/JP2022/003173
§ 371 (c)(1),
(2) Date: Aug. 4, 2023

(87) PCT Pub. No.: WO2022/172769
PCT Pub. Date: Aug. 18, 2022

(65) Prior Publication Data

US 2024/0093320 A1 Mar. 21, 2024

(30) Foreign Application Priority Data

Feb. 10, 2021 (JP) ................................ 2021-019720

(51) Int. Cl.
*C21C 5/52* (2006.01)
*F27B 1/28* (2006.01)
(Continued)

(52) U.S. Cl.
CPC .................. *C21C 5/52* (2013.01); *F27B 1/28* (2013.01); *F27D 17/00* (2013.01); *F27D 17/18* (2025.01)

(58) Field of Classification Search
None
See application file for complete search history.

(56) References Cited

U.S. PATENT DOCUMENTS 6,155,333 A 12/2000 Vallomy

FOREIGN PATENT DOCUMENTS

CN 205690871 U 11/2016
CN 107208974 A 9/2017
(Continued)

OTHER PUBLICATIONS

Mar. 24, 2025, Office Action issued by the China National Intellectual Property Administration in the corresponding Chinese Patent Application No. 202280013903.6 with English language search report.

(Continued)

*Primary Examiner* — Jenny R Wu
(74) *Attorney, Agent, or Firm* — KENJA IP LAW PC

(57) ABSTRACT

To reduce production costs by increasing molten iron heating efficiency, a production method using an electric furnace is provided with a preheating chamber, a melting chamber, a cold iron source supporter operable to partition the preheating chamber into a first and a second preheating chamber, an extruder, and a video device operable to observe the second preheating chamber is used, the method including a melting process, a heating process, a preheating process, and a tapping process are performed. In the heating process, heating of the molten iron is started after the cold iron source supporter is closed, and based on the visual information obtained via the video device of the second preheating chamber.

6 Claims, 3 Drawing Sheets

(51) Int. Cl.
*F27D 17/00* (2025.01)
*F27D 17/18* (2025.01)

(56) References Cited

FOREIGN PATENT DOCUMENTS

| | | | | | |
|---|---|---|---|---|---|
| CN | 108642237 | A | * | 10/2018 | ............. F27D 17/10 |
| CN | 109517941 | A | | 3/2019 | |
| CN | 211367630 | U | * | 8/2020 | |
| JP | H10292990 | A | | 11/1998 | |
| JP | 2001172713 | A | | 6/2001 | |
| JP | 2002053908 | A | | 2/2002 | |
| JP | 2002538295 | A | | 11/2002 | |
| JP | 2003049217 | A | | 2/2003 | |
| JP | 2004250724 | A | * | 9/2004 | |
| JP | 2012180560 | A | | 9/2012 | |
| JP | 2018159508 | A | | 10/2018 | |
| KR | 1019980018044 | A | | 6/1998 | |

OTHER PUBLICATIONS

Apr. 19, 2022, International Search Report issued in the International Patent Application No. PCT/JP2022/003173.
May 25, 2022, Office Action issued by the Taiwan Intellectual Property Office in the corresponding Taiwanese Patent Application No. 111104441 with English language Search Report.
Jul. 17, 2024, the Extended European Search Report issued by the European Patent Office in the corresponding European Patent Application No. 22752598.7.

* cited by examiner

METHOD FOR PRODUCING MOLTEN IRON USING ELECTRIC FURNACE PROVIDED WITH VIDEO DEVICE

TECHNICAL FIELD

The present disclosure relates to a method of producing molten iron from a cold iron source using an electric furnace provided with a video device. In particular, the present disclosure relates to a method of producing molten iron in which a cold iron source in a preheating chamber is separated from a melting chamber and a state of a lower portion of the preheating chamber is observed, allowing reliable supply of the cold iron source to the melting chamber and efficient production of molten iron.

BACKGROUND

In production of molten iron using an electric furnace, a cold iron source such as ferrous scrap is melted using arc heat to produce molten iron, and therefore there is a problem that a large amount of electric power is consumed to generate the arc heat. Conventionally, the following methods have been employed to reduce power consumption in electric furnaces: (1) preheating a cold iron source before melting by using high-temperature exhaust gas generated during melting of a cold iron source in subsequent processing; and (2) blowing a carbon material such as coke into a melting chamber as an auxiliary heat source.

As a specific method of (1) above, a preheating chamber operable to preheat a cold iron source is installed above the melting chamber, and the high-temperature exhaust gas generated in the melting chamber in a previous process is passed through the preheating chamber filled with the cold iron source to preheat the cold iron source. Thus, a preheated cold iron source is melted, and this is expected to improve melting efficiency and reduce electric power consumption.

Further, it is known that according to a specific method of (2) above, carbon monoxide gas is generated by reduction of iron oxide and combustion of carbon material due to blowing in of carbon material, which causes molten slag to bubble up, promoting so-called “slag forming”. This slag forming is expected to reduce radiant heat of an arc and improve cold iron source melting efficiency, thereby reducing electric power consumption.

Electric furnaces using the methods (1) and (2) above include, for example, a combined arc melting furnace disclosed in JP 2012-180560 A (PTL 1) and an arc melting apparatus disclosed in JP H10-292990 A (PTL 2).

According to PTL 1, a feature of the combined arc melting furnace is that it comprises a melting chamber and a shaft-type preheating chamber operable to draw in a high-temperature exhaust gas generated in the melting chamber. In the combined arc melting furnace of PTL 1, an apparent bulk density of ferrous scrap in the preheating chamber is adjusted to an appropriate range in order to efficiently preheat the ferrous scrap filled into the preheating chamber. A drawing in PTL 1 illustrates an openable and closable supply port at a top portion of the preheating chamber, and ferrous scrap supplied through the supply port and preheated in the preheating chamber moves continuously or intermittently in sequence into the melting chamber, depending on a speed at which the ferrous scrap is melted in the melting chamber.

Further, while PTL 2 introduces as conventional technology a technique of continuously supplying scrap to an arc furnace by a pusher (extruder); and a technique of supplying scrap to the arc furnace by opening a stopper called a finger (cold iron source supporter), the technology of PTL 2 relates to preheating scrap by increasing exhaust gas temperature and not providing scrap transfer and supply equipment such as pushers and fingers. Also according to PTL 2, scrap from a preheating shaft is supplied to a melting furnace as scrap melts in the melting furnace.

CITATION LIST

Patent Literature

PTL 1: JP 2012-180560 A
PTL 2: JP H10-292990 A

SUMMARY

Technical Problem

In the production of molten iron, once a cold iron source has been melted and a desired predefined amount of molten iron has accumulated in the melting chamber, typically molten iron is heated to a predefined temperature before being tapped. This heating is a process to secure the temperature of molten iron required in a subsequent process, such as composition adjustment and casting, after produced molten iron is transferred outside an electric furnace, and the heating temperature is set in consideration of a temperature drop during transfer of the molten iron to the subsequent process. However, as a result of study by the inventors, it became apparent that none of the technologies in PTLs 1 and 2 consider complete separation of the next charge of ferrous scrap in a preheating chamber from the melting chamber, which causes a problem of a reduction in efficiency of the heating due to relatively cold ferrous scrap entering the molten iron during the heating. Thus, electric power consumption cannot be effectively reduced when some of the ferrous scrap from the next charge is immersed in the molten iron, because the temperature of the molten iron drops, causing an extended heating period and unnecessary energy loss.

Further, heat is transferred to some of the ferrous scrap in contact with the molten iron, causing localized melting of the ferrous scrap in a lower portion of the preheating chamber, which causes the ferrous scrap in the preheating chamber to collapse and run off into the melting chamber. At such a time, a serious situation was observed in which ferrous scrap ran off to electrodes, causing electrode breakage.

On the other hand, in electric furnace operation, a chemical composition of molten iron required (for example, an amount of Cu, Cr, P, or the like) varies according to the type of steel, so multiple cold iron sources are combined to adjust the chemical composition. However, according to the technology of PTLs 1 and 2, when the type of cold iron source to be supplied is changed in a subsequent charge, ferrous scrap for the charge currently being melted and for the subsequent charge cannot be well separated, and therefore when even ferrous scrap for the subsequent charge is partially melted, it is difficult to strictly control the composition and production volume of molten iron.

In view of the above study, the inventors have arrived at the knowledge that, in order to improve heating efficiency and reduce electric power consumption in molten iron production, and more preferably, to strictly control the composition of molten iron to be produced, it is necessary to accurately separate a cold iron source in a preheating chamber from molten iron in a melting chamber during heating of the molten iron.

Based on the above knowledge, the inventors first focused on providing a cold iron source supporter that can hold a cold iron source in one compartment of a preheating chamber and separation of the cold iron source in the preheating chamber from the melting chamber during heating of molten iron.

However, even according to the above methods, there were still cases in which the heating efficiency was not significantly improved. The inventors further investigated this point and found that even when cold iron sources in the preheating chamber are separated from the melting chamber by the cold iron source supporter, a cold iron source that is not supplied to the melting chamber may remain below the cold iron source supporter (in a lower portion of the preheating chamber), and such a remaining cold iron source may unintentionally mix into the molten iron during heating. Therefore, the inventors arrived at the conclusion that, in order to ensure that the heating efficiency of molten iron is increased, in addition to separating a cold iron source from the melting chamber during heating of the molten iron by use of the cold iron source supporter, it is further necessary to ensure that a cold iron source does not remain below the cold iron source supporter.

In view of the above circumstances, it would thus be helpful to provide a method of producing molten iron by an electric furnace that is capable of increasing molten iron heating efficiency and reducing production cost. Preferably, it would also be helpful to effectively control the composition of produced molten iron.

Solution to Problem

As a result of the inventors' intensive study to solve the above problems, it was found that (1) a cold iron source in the preheating chamber is well separated from the melting chamber during heating by installation of a cold iron source supporter in the preheating chamber that is able to divide the preheating chamber into two portions, one on the introduction side of the cold iron source (typically vertically upward) and the other on the melting chamber side (typically vertically downward); (2) a cold iron source in a lower portion of the preheating chamber may be well supplied to the melting chamber during heating by installation of an extruder in the preheating chamber; and (3) by further providing an imaging device operable to observe the lower portion of the preheating chamber, the presence of a cold iron source that may unintentionally be mixed into molten iron during heating may be confirmed, and if such a cold iron source is found, it can be dealt with before the molten iron is heated, and therefore the cold iron source in the preheating chamber is accurately separated from the melting chamber during heating. The inventors also found that by preventing the unintentional introduction of a cold iron source to the molten iron, heating efficiency could be increased and the electric power consumption in production could be effectively reduced.

The present disclosure is made based on the above findings and is summarized as follows.

[1] A method of producing molten iron using an electric furnace provided with a preheating chamber operable to preheat a cold iron source and a melting chamber operable to melt the preheated cold iron source to produce molten iron, the electric furnace being further provided with a cold iron source supporter that is openable and closable and partitions the preheating chamber into a first preheating chamber on a cold iron source introduction side and a second preheating chamber on a melting chamber side, an extruder that is operable to advance and retract along a direction from the second preheating chamber toward the melting chamber, and a video device that is operable to observe the second preheating chamber, the method comprising:

a melting process in which, while the cold iron source supporter is open, the cold iron source that is supplied to the preheating chamber and preheated is supplied to the melting chamber by the extruder, and melting the cold iron source supplied to the melting chamber by arc heat to produce molten iron;

a heating process of heating the molten iron in the melting chamber while the cold iron source supporter is closed and a new cold iron source is introduced into the first preheating chamber;

a preheating process in which the new cold iron source in the first preheating chamber is preheated by exhaust heat from the heating process; and a tapping process to conduct the heated molten iron out of the electric furnace, wherein, in the heating process, heating of the molten iron is started based on visual information obtained via the video device of the second preheating chamber after the cold iron source supporter is closed.

[2] The method of producing molten iron according to [1] further comprises a preparation process in which the cold iron source supporter is opened to supply the new cold iron source that is preheated from the first preheating chamber to the second preheating chamber after the end of the tapping process, wherein the melting process, the heating process, the preheating process, and the tapping process are performed in sequence after the preparation process.

[3] The method of producing molten iron according to [2] wherein, in the preparation process, the cold iron source supporter is opened while a melting chamber-side tip of the extruder is positioned at a boundary between the second preheating chamber and the melting chamber.

[4] The method of producing molten iron according to any one of [1] to [3] wherein, in the heating process, the heating of the molten iron is started after confirmation is obtained via the video device that none of the cold iron source remains in the second preheating chamber after the cold iron source supporter is closed.

[5] The method of producing molten iron according to any one of [1] to [3] wherein, in the heating process, when confirmation is obtained via the video device that the cold iron source remains in the second preheating chamber after the cold iron source supporter is closed, the remaining cold iron source is supplied to the melting chamber by the extruder, and the heating of the molten iron is started after confirmation is obtained via the video device that none of the cold iron source remains in the second preheating chamber.

[6] The method of producing molten iron according to any one of [1] to [5] wherein, in the melting process, the heating process is performed after confirmation is obtained via the video device that a predefined amount of the cold iron source has been supplied to the melting chamber.

Advantageous Effect

According to the present disclosure, production of molten iron with high energy utilization efficiency is enabled by improving the heating efficiency of molten iron, thereby reducing production costs. Further, the present disclosure also preferably further enables accurate control of produced molten iron composition.

DETAILED DESCRIPTION

Figure 1:
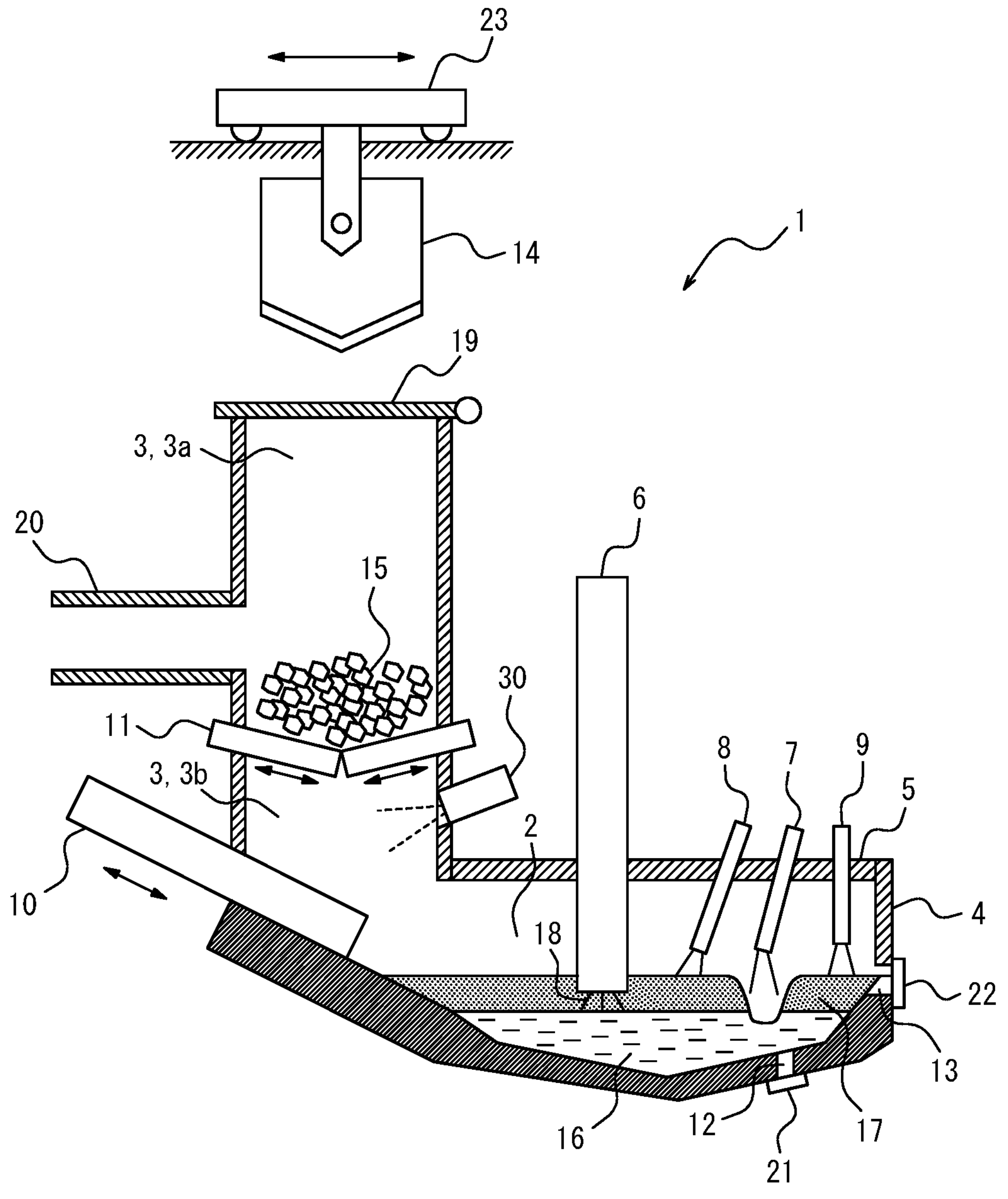
FIG. 1 is a longitudinal sectional view of an electric furnace provided with a video device used in an embodiment of the present disclosure.

The following describes embodiments of the present disclosure.

The following description merely indicates preferred embodiments, and the present disclosure is in no way limited to the examples described.

(Method of Producing Molten Iron)

The method of producing molten iron is a method using an electric furnace having a predefined structure. The method includes: a melting process in which a cold iron source preheated in a preheating chamber is supplied to a melting chamber by an extruder and melted in the melting chamber by arc heat to produce molten iron; a heating process in which the molten iron is heated while a cold iron source supporter is closed; a preheating process in which exhaust heat from the heating process is used to preheat the cold iron source; and a tapping process in which the heated molten iron is conducted out of the electric furnace, the method enabling continuous operation. Further, the method of producing molten iron may further include a preparation process in which the cold iron source supporter is opened after the tapping process to supply the preheated cold iron source from the first preheating chamber to the second preheating chamber, and may further include other processes. In the heating process, heating of the molten iron is started based on visual information obtained from a video device operable to observe the interior of the second preheating chamber.

Appropriate and timely control of the heating environment of molten iron based on the visual information of the interior of the second preheating chamber may prevent unintended addition of a cold iron source during the heating of molten iron and thereby effectively increase molten iron heating efficiency.

[Electric Furnace]

The following is a description of an electric furnace that is preferably used, described with reference to the drawings.

An electric furnace 1 comprises a melting chamber 2 in which a cold iron source 15 is melted by heat from an arc 18 to produce molten iron 16, a shaft-type preheating chamber 3 connected to the melting chamber 2 operable to preheat the cold iron source 15 and supply the cold iron source 15 that is preheated to the melting chamber 2 by use of an extruder 10, and a video device 30 installed at an arbitrary position. A cold iron source supporter 11 that is openable and closable is provided at an arbitrary position in the vertical direction of the preheating chamber 3. The cold iron source supporter 11 is openable and closable in a cross-sectional or horizontal direction of the electric furnace 1, for example. Opening the cold iron source supporter 11 makes the preheating chamber 3 have one space. Conversely, closing the cold iron source supporter 11 makes the preheating chamber 3 have two spaces: a first preheating chamber 3*a*, which is partitioned to a cold iron source introduction side (upper vertical direction) and a second preheating chamber 3*b*, which is partitioned to a melting chamber side (lower vertical direction). The extruder 10 is typically installed in the second preheating chamber 3*b*, and one end is movable back and forth to any position between the second preheating chamber 3*b* and the melting chamber 2 that is adjacent. The video device 30 allows checking on a situation in the second preheating chamber 3*b* at any time, and at all times, as required.

The cold iron source 15 that is raw material is temporarily stored by type in a scrap yard, for example, and types are mixed with an appropriate type and mass ratio according to the type of molten iron to be produced. The mixed cold iron source 15 is loaded into a bottom-opening supply bucket 14 and transported via a travel cart 23 to a desired position above a cold iron source supply port 19. Next, the cold iron source supply port 19 is opened to supply the cold iron source 15 from above into the preheating chamber 3. At this time, the cold iron source supporter (finger) 11 provided substantially centrally in the preheating chamber 3 is open, and therefore the supplied cold iron source 15 is filled across the first preheating chamber 3*a*, which can accommodate an upper part of the cold iron source supporter 11, and the second preheating chamber 3*b*, which can accommodate a lower part of the cold iron source supporter 11.

The cold iron source 15 may be supplied such that one charge of the cold iron source 15 is divided over multiple loads of the supply bucket 14. For example, when the amount of the cold iron source 15 for one charge is 130 tonnes by design, and this is divided into 13 loads from the supply bucket 14, 10 tonnes×13 times=130 tonnes in total, or 10 tonnes per time.

The cold iron source 15 typically includes, but is not limited to, in-house scrap generated by steelworks, city-generated scrap, and pig iron from solidified hot metal. The cold iron source 15 may be mixed with organic material (for example, plastic, rubber, biomass).

On the other hand, tailings material for producing molten slag 17 include, but are not limited to, quicklime and limestone. Light burnt dolomite or recycled slag from steelmaking or the like may be used as tailings material. Tailings material may be supplied from an auxiliary material chute (not illustrated) provided to an upper portion of the melting chamber 2.

In the preheating chamber 3 (the first preheating chamber 3*a* and the second preheating chamber 3*b*), the cold iron source 15 may be preheated by any method. For example, preheating the cold iron source 15 by passing high-temperature exhaust gas generated in the melting chamber 2 first through the first preheating chamber 3*a* and the second preheating chamber 3*b* is suitable for increasing production efficiency. In this case, an exhaust duct 20 may be provided in the upper portion of the preheating chamber 3 and the duct 20 may be connected to a suction blower (not illustrated). Suction by the suction blower allows the high-temperature exhaust gas generated in the melting chamber 2 to flow into and pass through the preheating chamber 3, and after rising in the preheating chamber 3, the high-temperature exhaust gas may be exhausted through the duct 20. A dust collector (not illustrated) may be installed centrally in the duct 20.

High-temperature exhaust gases that are suitable for use in preheating are generated by melting and heating by an arc heating area as a primary heat source, carbon material, a burner 9, and the like as an auxiliary heat source, as described below, and may include carbon monoxide, carbon dioxide, unreacted oxygen, and external air entering through openings and the like.

The second preheating chamber **3*b* is provided with the extruder 10 (pusher) to extrude and supply the preheated cold iron source 15 in the second preheating chamber 3*b* into the melting chamber 2 connected to the preheating chamber 3. The extruder 10 may be installed penetrating a side wall of the melting chamber 2 and may be operable to advance and retract along a direction toward an arc heating area (according to the present embodiment, an approximate center of the melting chamber) generated by the arc 18, which allows the preheated cold iron source 15 to be extruded from the second preheating chamber 3*b* to the arc heating area of the melting chamber 2. The extruder 10** may be driven by a drive unit (not illustrated).

A boundary between the melting chamber 2 and the preheating chamber 3 (second preheating chamber **3*b*) is an imaginary plane extending vertically downward from a portion of a side wall of the preheating chamber 3 that is connected to a furnace lid 5 that is part of the melting chamber 2**.

The melting chamber 2 is partitioned by a furnace wall 4 and the furnace lid 5. The furnace wall 4 is preferably a water-cooled structure, and the furnace lid 5 is preferably a water-cooled structure that is openable and closable. By inserting a plurality of electrodes 6 from above through the furnace lid 5 into an approximate center in a horizontal direction of the melting chamber 2 and generating the arc 18 between the electrodes 6, an arc heating area may be configured as the primary heat source to melt the cold iron source 15. Typically, the electrodes 6 are composed mainly of graphite and are movable up and down.

There are two types of the electric furnace 1: a direct current type and an alternating current type. The example of the electric furnace 1 according to the present embodiment is an alternating current type and includes the electrodes 6 described above. On the other hand, when the electric furnace 1 is a direct current type, electrodes may be installed at the bottom of the furnace and at an upper portion of the melting chamber, respectively, and an arc may be generated between the electrodes to melt the cold iron source. The present disclosure is also applicable to the production of molten iron by direct current type electric furnaces.

An oxygen blowing lance 7 and a carbon material blowing lance 8 may be inserted into the melting chamber 2 from above through the furnace lid 5. The carbon material blowing lance 8 is operable to blow carbon material, consisting of one or more of coke, char, coal, charcoal, graphite, or the like as an auxiliary heat source into the molten slag 17 via a carrier gas such as air, nitrogen, or the like. The oxygen blowing lance 7 is operable to inject and supply oxygen (pure oxygen or an oxygen-containing gas mixture of pure oxygen and air, for example) to push away the molten slag 17 and directly blow oxygen into the molten iron 16. The molten iron 16 that is blown with oxygen is decarburized to a desired carbon content.

In addition to blowing with a lance, oxygen and carbon material may be added by injection into a bath (the molten iron 16 or the molten slag 17) from above the melting chamber 2, or by bottom-blowing injection with a dedicated nozzle at the bottom of the furnace. The oxygen blowing lance 7 and the carbon material blowing lance 8 may be immersed in the molten iron 16 and the molten slag 17, respectively, or may follow the molten iron 16 and the molten slag 17 above a surface (interface) in response to changes in level of the molten iron 16 and the molten slag 17 interface, as illustrated by the embodiment in FIG. 2A, 2B, 2C, 2D. Further, the oxygen blowing lance 7 may be installed to the furnace wall 4 and oxygen may be blown in through the furnace wall 4.

The burner 9 may be inserted into the melting chamber 2 from above through the furnace lid 5 and/or at an angle through the furnace wall 4. The burner 9 serves as an auxiliary combustion burner that burns a fossil fuel such as heavy oil, kerosene, pulverized coal, propane gas, natural gas, or the like with a combustion-supporting gas (oxygen, air, or oxygen-enriched air). When the molten iron 16 is tapped, there should be no unmelted cold iron source 15 remaining in the molten iron 16. Here, a cold iron source near the electrodes melts relatively quickly, but a cold iron source in a so-called cold spot, which is located far from the electrodes, melts relatively slowly, and melting rates of cold iron sources in the melting chamber may become uneven. In such a case, the burner 9 may be used to efficiently help melt the unmelted cold iron source 15 during a heating process, for example. The burner 9 is preferably disposed directly above a tapping port 12, which is described below, or in other words, in a position where a cold spot is likely to occur.

The melting chamber 2 may be further provided with the tapping port 12 on an opposite side of the furnace bottom to the preheating chamber 3 and a tailings outlet 13 on the furnace wall 4 above the tapping port 12. During all processes other than the tapping process, the tailings outlet 13 is closed by a tailings door 22. During all processes other than the tapping process, the tapping port 12 is closed by packing sand and mud agent that are filled inside, and a tapping door 21 that holds in such from outside the furnace. The molten iron 16 that is produced may be tapped from the tapping port 12 by opening the tapping door 21. The molten slag 17 that is produced along with the production of the molten iron 16 may be discharged from the tailings outlet 13 by opening the tailings door 22.

The second preheating room is observable via the video device 30. The video device 30 is not limited to any particular device, may be any device capable of imaging an object, and is typically provided with a lens and a camera. Cooling gas at any flow velocity is preferably flowed around the lens (not illustrated) installed at a tip of the video device 30. Appropriate cooling of the video device 30 allows it to withstand the high temperatures in the electric furnace and to prevent a field of view from being narrowed when slag or molten steel is splattered. The cooling gas may be air and may be an inert gas such as nitrogen.

The video device 30 is preferably installed to the side wall that is part of the second preheating chamber **3*b* in order to obtain a good view of a situation inside the second preheating chamber 3*b*. In such a case, cooling, such as water cooling or air cooling, is preferably provided for the side wall of the preheating chamber 3. Although an installation method is not limited to any particular method, when the video device 30 is installed to the side wall of the second preheating chamber 3*b*, the video device 30 is preferably installed through a hole (not illustrated) in the side wall so that the camera may be disposed outside the electric furnace 1 while the lens is disposed inside the second preheating chamber 3***b*, thus enabling both a clear image field and easy operation. Video captured by the video device 30 is generally transmitted via a cable connection (not illustrated) to a monitor or recording device in an operation room where an operator operates.

Further, although not illustrated, monitoring a situation in the first preheating chamber 3*a* by using a video device is preferable. When the situation inside the first preheating chamber 3*a* can also be visually checked, for example, a height of the cold iron source 15 filled in the preheating chamber may be checked, and a cold iron source may be supplied to keep the height within a certain range, allowing more efficient preheating of a cold iron source. To observe the situation inside the first preheating chamber 3*a*, for example, an additional video device may be installed to the side wall that is part of the first preheating chamber 3*a*.

[Melting Process]

Figure 2A:
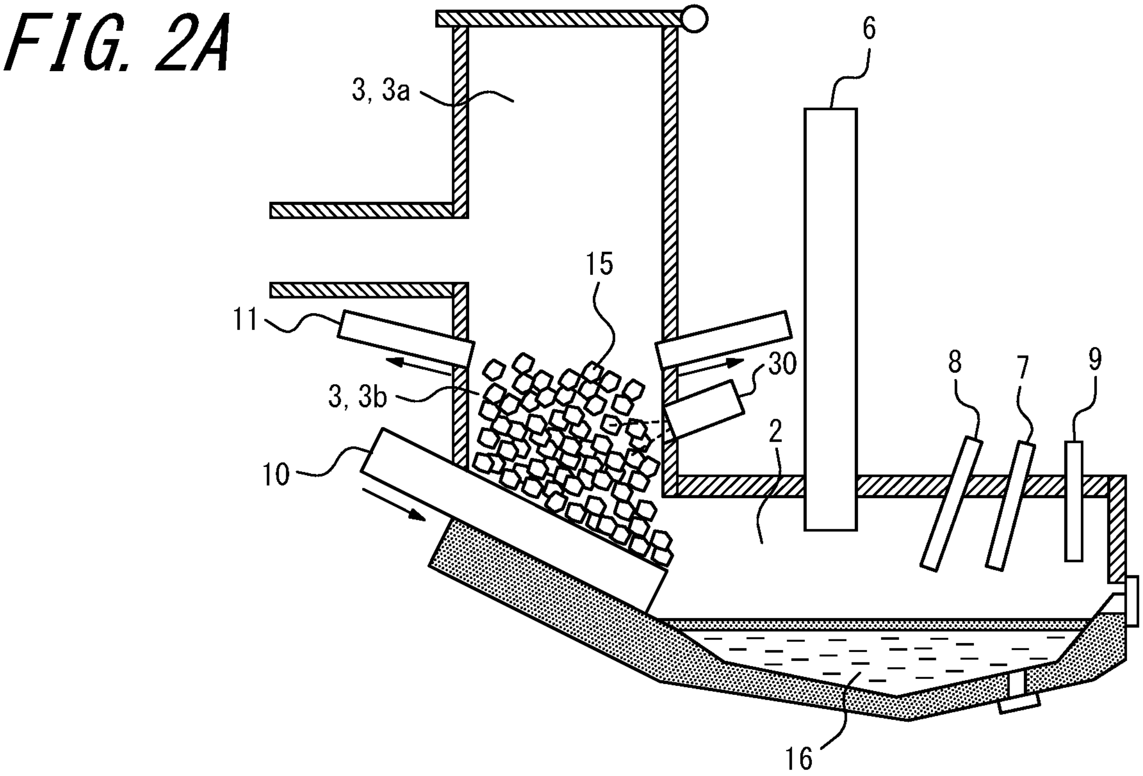
FIG. 2A is a conceptual diagram illustrating a preparation process according to an embodiment of the present disclosure.
Figure 2B:
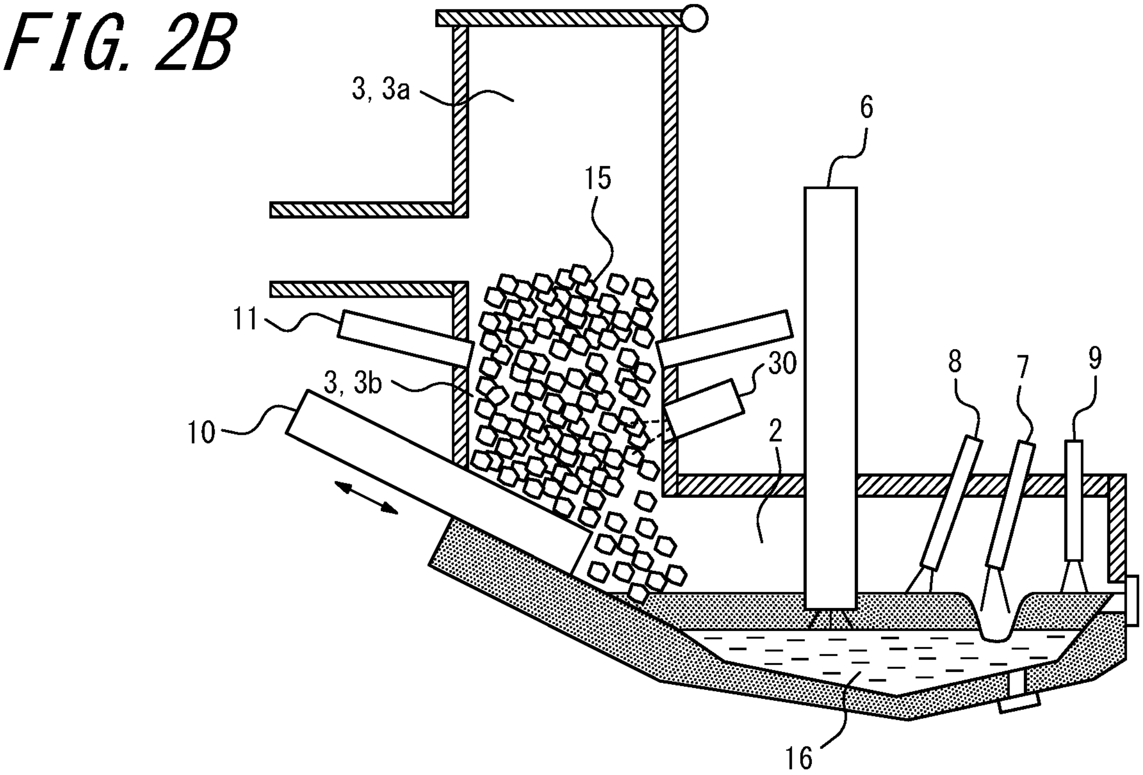
FIG. 2B is a conceptual diagram illustrating a melting process according to an embodiment of the present disclosure.

In the melting process, the cold iron source 15 preheated in the preheating chamber 3 is supplied to the melting chamber 2 by the extruder 10 while the cold iron source supporter 11 is open, referring to FIG. 2B, and the cold iron source 15 supplied to the melting chamber 2 is melted by arc heat to produce the molten iron 16. By repeatedly advancing and retracting the extruder 10 in the arrow directions in FIG. 2B, the cold iron source 15 filled in the second preheating chamber 3*b* is sequentially extruded. As the cold iron source 15 filled in the preheating chamber 3 sequentially drops, new cold iron source 15 is repeatedly supplied into the preheating chamber 3 from the supply bucket 14. This allows an amount of cold iron source for one charge to be melted.

Here, from the viewpoint of production efficiency, the cold iron source 15 filled in the preheating chamber 3 is preferably efficiently preheated by allowing the high-temperature exhaust gas generated by melting in the melting chamber to flow into the preheating chamber 3 by the method described above for an electric furnace, for example. According to the present embodiment, the temperature of the exhaust gas flowing into the preheating chamber 2 is about 1000° C. to 1500° C.

The molten slag 17 in the melting process may contain iron oxide (FeO) formed due to the blowing of oxygen. Therefore, FeO is preferably reduced by blowing carbon material into the molten slag 17 according to the method described above. The molten slag 17 is also preferably in a so-called "slag forming" state, in which carbon monoxide gas is generated by the combustion of the blown-in carbon material, causing the molten slag 17 to bubble. Slag forming reduces radiant heat of the arc 18 and further improves the melting efficiency of the cold iron source 15. Shorter melting times with higher melting efficiency may extend a period during which the slag forming state can be stably maintained, further improving energy efficiency.

In the melting process, after visual confirmation via the video device 30 that a predefined amount of the cold iron source 15 for one charge has been supplied to the melting chamber 2, the cold iron source supporter 11 is preferably closed while a subsequent heating process is started. By confirming via the video device 30 that the predefined amount of the cold iron source 15 for one charge has been supplied to the melting chamber 2, unintended addition of the cold iron source 15 into molten iron during subsequent heating of the molten iron 16 may be better prevented and the subsequent heating process may be performed more efficiently.

At a start of operation of the electric furnace 1 for a certain charge (that is, the first supply of the cold iron source 15), the cold iron source 15 and, if required, carbon material may be supplied in advance to a space in the melting chamber 2 opposite the preheating chamber 3 (on paper, in FIG. 2A, to the right side of the electrodes 6) while the furnace lid 5 is open, in order to uniformly supply the cold iron source 15 to the melting chamber 2. Hot metal may also be supplied to the melting chamber 2 when the cold iron source 15 is supplied. Hot metal may be supplied to the melting chamber 2 by means of a supply ladle (not illustrated) or a hot metal trough (not illustrated) leading to the melting chamber 2.

[Heating Process]

Figure 2C:
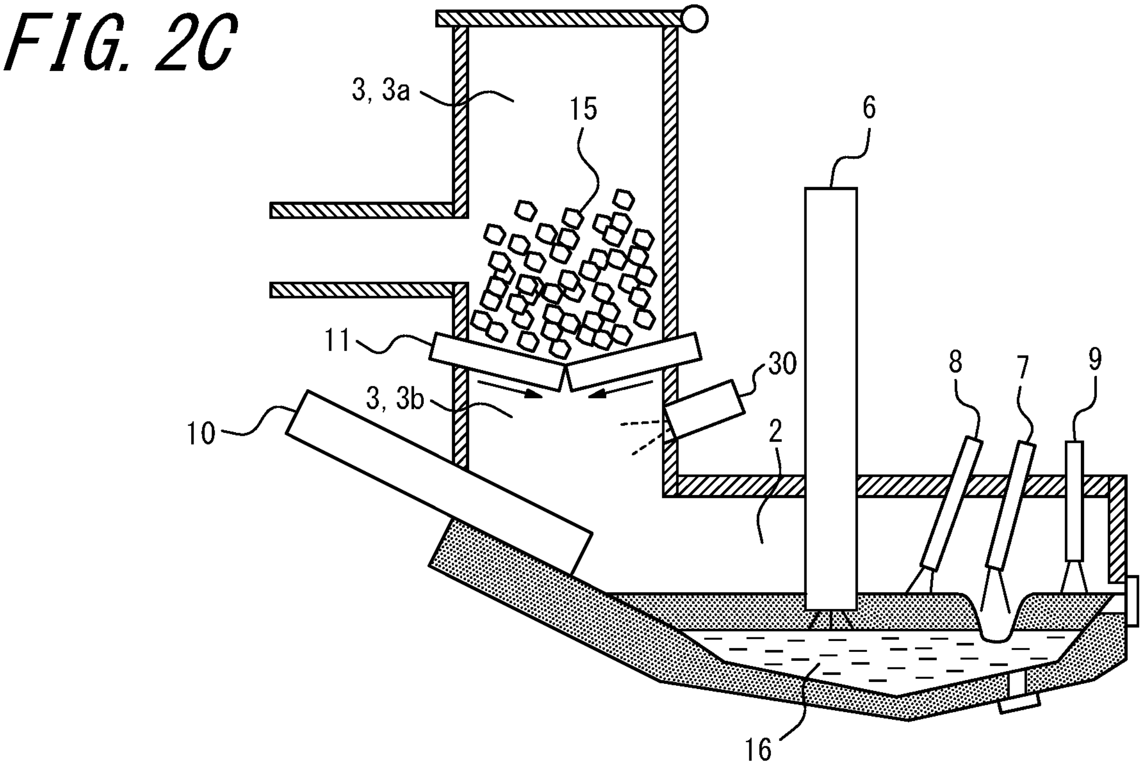
FIG. 2C is a conceptual diagram illustrating a heating process according to an embodiment of the present disclosure.

In the heating process, the molten iron 16 produced in the previous melting process is further heated to a desired temperature while the cold iron source support unit 11 is closed and the first preheating chamber 3*a* is shut off from the melting chamber 2, see FIG. 2C. The molten iron 16 tapped after the heating process and transported to a subsequent process outside the electric furnace, such as composition adjustment and casting, must maintain the desired high temperature state required for the subsequent process. Therefore, it is necessary to raise the temperature of the molten iron 16 during the heating process to a defined temperature designed to take into account a temperature drop during the transition to the subsequent process outside the electric furnace after the tapping process. The molten iron 16 is not tapped until the temperature of the molten iron 16 is raised to a predefined temperature. In the heating process, a new cold iron source 15 for a subsequent charge is introduced into the first preheating chamber 3*a* while the cold iron source supporter 11 is closed and the first preheating chamber 3*a* is shut off from the melting chamber 2. In the heating process, it is important to start heating the molten iron 16 based on the visual information obtained from the video system 30 of the interior of the second preheating chamber 3*b* after the cold iron source supporter 11 is closed. For example, when there is the cold iron source 15 that is not supplied to the melting chamber 2 remaining in the second preheating chamber 3*b* after the cold iron source supporter 11 is closed, if heating occurs in this state, the relatively low temperature cold iron source 15 is undesirably mixed with the relatively high temperature molten iron 16 during the heating, lowering the temperature of the molten iron 16. This reduces the efficiency of the heating process, which consumes large amounts of electric power, and leads to higher production costs. Therefore, visually checking conditions in the second preheating chamber 3*b* before starting the heating process is necessary.

According to conventional technology, an operator could not visually check the condition of the second preheating chamber 3*b*, so the timing of heating was based on operator experience. However, according to the present disclosure, the timing of heating may be determined after checking via the visual information that no factors hindering heating efficiency exist, thereby dramatically improving heating efficiency and thus manufacturing efficiency.

From the above viewpoint, in the heating process, heating the molten iron 16 is preferably started after visually confirming via the video device 30 that none of the cold iron source 15 remains in the second preheating chamber 3*b* after the cold iron source supporter 11 is closed. When confirmation is obtained via the video device 30 that none of the cold iron source 15 remains, the heating may be started.

On the other hand, when confirmation is obtained via the video device 30 that the cold iron source 15 remains in the second preheating chamber 3*b* after the cold iron source supporter 11 is closed, the remaining cold iron source 15 is forcibly supplied to the melting chamber 2 by the extruder 10, and heating of the molten iron 16 is preferably started after confirming that none of the cold iron source 15 remains in the second preheating chamber 3*b*.

Thus, by heating the molten iron 16 when the cold iron source 15 is definitely not present in the second preheating chamber 3*b*, the temperature of the molten iron 16 during heating is not lowered, which may further increase the heating efficiency.

Similarly to the melting process, a stable slag forming condition is preferably maintained during the heating process to further improve energy efficiency. According to conventional technology, the cold iron source 15 from the preheating chamber 3 runs off into the melting chamber 2 during the heating process, causing slag forming to subside and therefore the arc 18 to become unstable, resulting in a decrease in heating efficiency. In contrast, according to the present embodiment, the cold iron source 15 in the first preheating chamber 3*a* during the heating process is completely shut off from the melting chamber 2 by the cold iron source support 11, effectively preventing run off of the cold iron source 15 during the heating process, and visual confirmation that the interior of the second preheating chamber 3*b* is in a suitable condition to start heating may be obtained, and therefore the slag forming and the arc 18 are stably maintained, and thus the heating efficiency may be improved.

Here, in the heating process, the cold iron source 15 for the next charge is supplied to the first preheating chamber 3*a*. During the heating process, the cold iron source supporter 11 is closed to shut off the first preheating chamber 3*a* from the melting chamber 2, and the condition of the interior of the second preheating chamber may be visually checked, and therefore, for example, even when the cold iron source 15 for the current charge remains in the second preheating chamber 3*b*, the remaining cold iron source 15 may be accurately separated from the cold iron source 15 for the next charge in the first preheating chamber 3*a*. According to conventional technology, the cold iron source supporter 11 is not provided and the second preheating chamber 3*b* could not be visually checked, and therefore separation of the cold iron source 15 for the current charge and the next charge depended on operator experience. However, according to the present disclosure, the cold iron source supporter 11, the video device 30, and the extruder 10 that can forcibly supply remaining cold iron source 15 into the melting chamber 2 are provided, and therefore the cold iron source 15 for the current charge may be accurately separated and handled without mixing with the cold iron source 15 for the next charge. This is very useful, especially in a situation where the next charge produces the molten iron 16 with a different composition or property than the current charge.

[Preheating Process]

In the preheating process, the new cold iron source (cold iron source for the next charge) 15 in the first preheating chamber 3*a* is preheated by the residual heat from the heating process. Accordingly, the preheating process proceeds almost simultaneously with the heating process. Preheating can be performed by allowing residual heat, such as high-temperature exhaust gas generated during heating, to flow into the first preheating chamber 3*a* using the method described above for electric furnaces, for example. In the heating process, the melting chamber 2 is heated to a high temperature of about 1600° C., for example, and therefore the cold iron source 15 for the next charge in the first preheating chamber 3*a* may be efficiently preheated, increasing the melting efficiency for the next charge. In the preheating process, the temperature of the exhaust gas flowing into the first preheating chamber 3*a* is about 1000° C. to 1600° C.

Once the molten iron 16 is heated to the set temperature, processing transitions to the tapping process.

[Tapping Process]

Figure 2D:
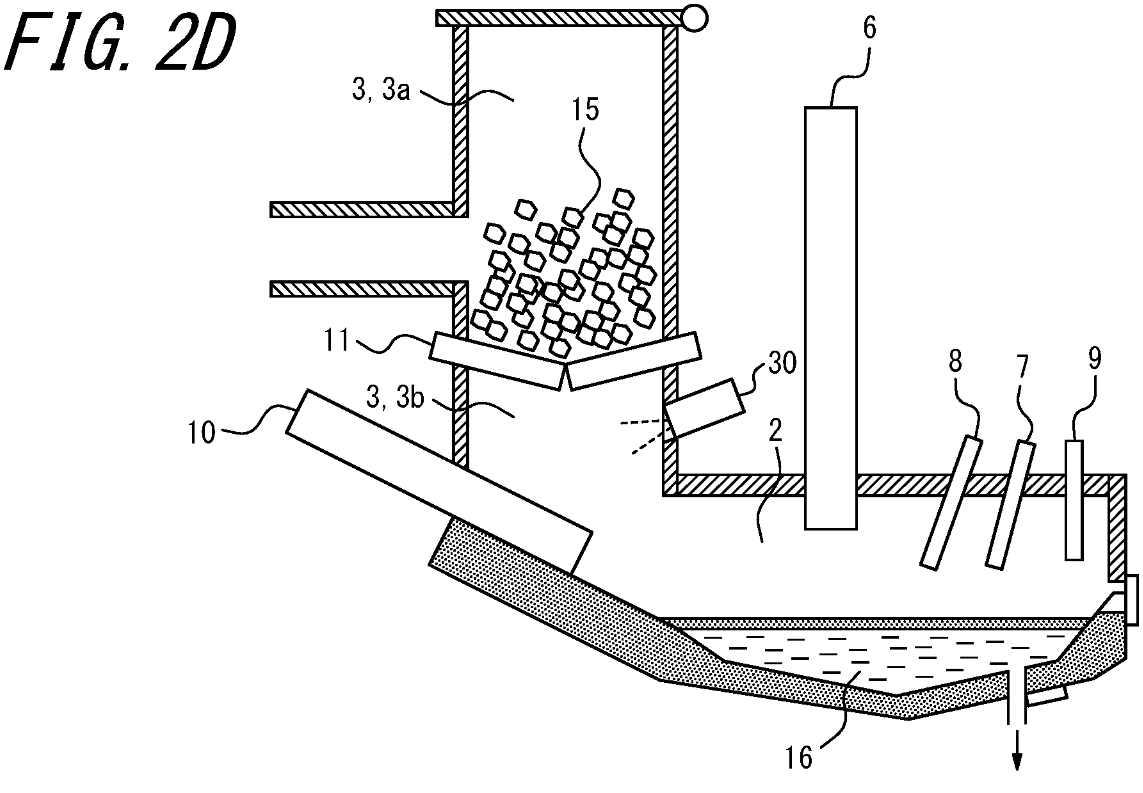
FIG. 2D is a conceptual diagram illustrating a tapping process according to an embodiment of the present disclosure.

In the tapping process, the molten iron 16 that is heated is conducted out of the electric furnace 1 while the cold iron source supporter 11 is closed, see FIG. 2D. In this way, the molten iron 16 for one charge is produced. A specific method of tapping may follow the method described above for the electric arc furnace.

Preheating the cold iron source 15 for the next charge in the first preheating chamber 3*a* preferably continues during the tapping process. When preheating the cold iron source 15 for the next charge in the first preheating chamber 3*a* during the tapping process, residual heat such as high-temperature exhaust gas remaining from the heating process may continue to flow into the first preheating chamber 3*a* using the method described above for the electric furnace, for example. The temperature of the exhaust gas flowing into the first preheating chamber 3*a* is about 1100° C. to 1600° C.

[Preparation Process]

In the preparation process, which may be included in the production method of the present disclosure, referring to FIG. 2A, the cold iron source supporter 11 is opened after the end of the tapping process to supply, from the first preheating chamber 3*a* to the second preheating chamber 3*b*, a new cold iron source (cold iron source for the next charge) 15 that has been preheated during the heating process and optionally the tapping process described above. This completes the preparation process for the next charge. Then, by repeating the melting process, the heating process, the preheating process, and the tapping process for the next charge of the cold iron source 15, continuous operation for multiple charges is possible. The cold iron source 15 supplied to the second preheating chamber 3*b* in the preparation process is already sufficiently preheated, allowing the subsequent melting process and subsequent processing to be performed efficiently.

In the preparation process, the cold iron source supporter 11 is preferably opened while a tip of the extruder 10 on the melting chamber 2 side is positioned at the boundary between the second preheating chamber 3*b* and the melting chamber 2 (see FIG. 2A). This prevents the cold iron source 15 from running off into the melting chamber 2 during the subsequent melting process, thereby preventing a decrease in melting efficiency and preventing damage to electrodes and the like.

[Other Processing]

Other processes are not limited to any particular process, and may include, for example, a tailings process in which the molten slag 17 is removed from the electric furnace. The tailings process may be performed, for example, according to the method described above for electric furnaces.

EXAMPLE

The following describes a specific example of the present disclosure. The following example merely indicates a preferred example, and the present disclosure is not limited in any way to the described example. Further, the following example may be modified without departing from the scope and spirit of the present disclosure, and such modifications are also included in the technical scope of the present disclosure.

Example

Molten iron was produced by melting a cold iron source in an electric furnace provided with the melting chamber 2, the preheating chamber 3, the cold iron source supporter 11, the extruder 10, and the video device 30 installed in the second preheating chamber 3*b*, as illustrated in FIG. 1. The equipment specifications of this electric furnace are listed below.

Melting chamber: furnace diameter 7 m, furnace height 5 m

Preheating chamber: 3 m wide, 4 m deep, 8 m high

Furnace capacity: 210 tonnes

Electric power: 50 Hz AC

Transformer capacity: 75 MVA

Number of electrodes: 3

Basic operating conditions of the electric furnace are listed below.

Supply weight of cold iron source per charge: approx. 130 tonnes

Supply weight of cold iron source each time: approx. 10 tonnes

Number of times cold iron source is supplied per charge: 13 times

Steel output per charge: approx. 120 tonnes

Oxygen consumption rate with oxygen blowing lance: approx. 20 Nm3/tonne tapped

Carbon material consumption rate with carbon material blowing lance: approx. 20 kg/tonne tapped Lime consumption rate as tailings material: approx. 18.8 kg/tonne tapped Here, "tonne tapped" means the weight of molten iron tapped (in tonnes), and "/tonne tapped" means per tonne of molten iron tapped.

Cold iron sources were used from raw materials defined in the "Uniform Standards of Ferrous Scrap" of The Japan Ferrous Raw Materials Association, as listed below (total mix proportion: 100%).

Heavy (grade: H2), 60% mix proportion

New scrap (grade: busheling A), 20% mix proportion

Shredded (grade: A), 10% mix proportion

Cast iron (grade: A), 5% mix proportion

Turning (grade: A), 5% mix proportion

To continuously produce molten iron of the same composition for 20 charges, 210 tonnes of the cold iron source 15 was first supplied to the melting chamber 2 and the preheating chamber 3, and melting proceeded under the condition that the cold iron source 15 was continuously present in the melting chamber 2 and preheating chamber 3. Heating occurred when approximately 200 tonnes of the molten iron 16 was produced in the melting chamber 2. Then, 80 tonnes were left in the melting chamber 2, and 120 tonnes of the molten iron 16 for one charge were tapped from the tapping port 12 to a ladle outside the furnace.

During the heating, approximately 10 tonnes at a time (or an amount equivalent to multiple times) of the cold iron source 15 was supplied to the first preheating chamber 3*a* while the cold iron source supporter 11 was closed. At this time, the heating process of the previous charge was in progress, and the exhaust gas from the melting chamber 2 was used to preheat the cold iron source 15 in the first preheating chamber 3*a*. In the subsequent tapping process of the previous charge, the cold iron source 15 in the first preheating chamber 3*a* continued to be preheated using exhaust gas from the melting chamber 2.

<Preparation Process>

After the end of the tapping process of the previous charge, the cold iron source supporter 11 was opened and the preheated cold iron source 15 was supplied from the first preheating chamber 3*a* to the second preheating chamber 3*b*. At this time, the tip of the extruder 10 on the melting chamber 2 side was positioned at the boundary between the second preheating chamber 3*b* and the melting chamber 2.

<Melting Process>

While the cold iron source supporter 11 was open, the cold iron source 15 in the second preheating chamber 3*b* was supplied to the melting chamber 2 by the extruder 10, and the cold iron source 15 was melted by the heat of the arc 18 generated by the electrodes 6 (graphite electrodes) to produce the molten iron 16. Pure oxygen was fed at 3000 Nm3/h to 5000 Nm3/h from the oxygen blowing lance 7, and coke breeze was blown at 40 kg/min to 80 kg/min from the carbon material blowing lance 8. The coke breeze had a fixed carbon content of 85 mass % or more, moisture content of 1.0 mass % or less, volatile content of 1.5 mass % or less, and average particle size of 5 mm or less. Quicklime used as a tailings material was supplied from an auxiliary material feed chute (not illustrated) provided to the furnace lid 5.

During the melting process, the interior of the second preheating chamber 3*b* was monitored via the video device 30. As the cold iron source 15 filled in the preheating chamber 3 was sequentially lowered as the cold iron source 15 was melted in the melting chamber 2 and extruded by the extruder 10, approximately 10 tonnes of new cold iron source 15 transported by the supply bucket 14 was added into the preheating chamber 3 through the cold iron source supply port 19, maintaining a fill height of the cold iron source 15 in the preheating chamber 3 within a certain range. By repeating this process for a total of 13 times, melting proceeded with the cold iron source 15 continuously present in the melting chamber 2 and the preheating chamber 3, and a total of approximately 130 tonnes of the cold iron source 15 was melted in the melting chamber 2, which is equivalent to one charge.

In fact, about 200 tonnes of the molten iron 16 accumulated in the melting chamber 2, including the 80 tonnes of the molten iron 16 that had remained in the melting chamber 2 during the previous charge. When a change is desired in the composition of the molten iron produced before and after a charge, the next charge of molten iron may be melted without leaving the molten iron 16 from the previous charge in the melting chamber 2.

<Heating Process>

When about 200 tonnes of the molten iron 16 had accumulated in the melting chamber 2, the cold iron source supporter 11 was closed and the second preheating chamber 3*b* was checked via the video device 30. As a result of the visual information obtained from the video device 30, it was confirmed that the cold iron source 15 remained in the second preheating chamber 3*b*. Therefore, instead of immediately starting heating, the extruder 10 was repeatedly advanced and retracted until the remaining cold iron source 15 was supplied into the melting chamber 2 and was no longer visible in the second preheating chamber 3*b*. Then, after confirming that none of the cold iron source 15 remained in the second preheating chamber 3*b*, heating was started. Approximately 3 minutes to 4 minutes after heating started, a temperature probe was inserted into the molten iron 16 and the temperature of the molten iron was measured. When the temperature of the molten iron reached 1600° C., the temperature set for heating, processing transitioned to the tapping process. When the temperature had not reached the heating temperature, after another minute of heating the temperature of the molten iron was measured again to determine whether or not tapping was possible, and this sequence was repeated as required.

During the above heating process, approximately 10 tonnes of the cold iron source 15, one load for the next charge, was supplied to the first preheating chamber 3*a* while the cold iron source supporter 11 was closed.

<Preheating Process>

The cold iron source 15 for the next charge supplied to the first preheating chamber 3*a* was preheated using preheat (exhaust gas) from the melting chamber 2 due to the heating, concurrently with the heating process.

<Tapping Process>

After the heating, 80 tonnes of the molten iron 16 out of approximately 200 tonnes remained in the melting chamber 2, and 120 tonnes of the molten iron 16, equivalent to one charge, was tapped from the tapping port 12 to the ladle outside the furnace. During the tapping process, the cold iron source 15 in the first preheating chamber 3*a* continued to be preheated using exhaust gas from the melting chamber 2. The temperature of the molten iron 16 at the time of tapping was about 1600° C. The target carbon concentration of the molten iron was 0.060 mass %. After the tapping process, a state of the molten iron 16 was maintained by blowing in oxygen and coke, and the above-mentioned <preparation process> and subsequent processes were repeated for a total of 20 Charges.

Comparative Example 1

During the heating process, the extruder 10 was operated and heating occurred according to the operator's empirical judgment without using the cold iron source supporter 11 and the video device 30 (that is, the cold iron source supporter 11 was left open throughout the entire process and no visual check was made of the furnace interior). Otherwise, 20 charges were repeated as in the above Example.

Comparative Example 2

During the heating process, the cold iron source supporter 11 and extruder 10 were operated and heating occurred according to the operator's empirical judgment without the use of the video device 30 (that is, no visual check was made of the furnace interior). Otherwise, 20 charges were repeated as in the above Example.

For the Example and the Comparative examples, the average time required for each process over 20 charges (minutes), the average electric power consumption rate over the entire production process (kWh/t), the frequency of cold iron source mixing into molten iron in the heating process (times/charge), the average noise level in the electric furnace during operation (dB), and the average carbon concentration in the molten iron (mass %) in the molten iron were evaluated. The results are listed in Table 1.

Here, the average electric power consumption rate was calculated as an amount of electric power used per tonne of molten iron tapped over 20 charges.

The frequency of cold iron source mixing was calculated by dividing the number of times a loud noise generated by collapsing cold iron source was heard by ear by the number of charges.

Noise level of the electric furnace was measured with a decibel meter at a distance of 5 m from the furnace. The noise level of the electric furnace is an indicator of good or bad slag forming; the lower the noise level, the more stable the arc. Measurements were taken during the melting and heating processes, and the average value was calculated.

The carbon concentration in the molten iron was measured by inserting a probe for carbon concentration measurement into the molten iron together with the above temperature probe, and the average value of all charges was calculated.

TABLE 1

| | | Average time (minutes) | | | | | Average electric power consumption rate (kWh/t) | Mixing frequency of cold iron source into molten iron during heating (times/ charge) | Average noise level (dB) | Average carbon concentration in molten iron (mass %) |
|---|---|---|---|---|---|---|---|---|---|---|
| | Conditions for heating process | Preparation process | Melting process | Heating process * | Tapping process | Overall production process | | | | |
| Comparative example 1 | Operate extruder according to empirical judgment | 4 | 38 | 7 | 2 | 51 | 385 | 0.2 | 94 | 0.055 |
| Comparative example 2 | Operate cold iron source supporter and extruder according to empirical judgment | 4 | 38 | 6 | 2 | 50 | 380 | 0.1 | 90 | 0.057 |
| Example | Operate cold iron source supporter and extruder according to visual information from the video device | 4 | 36 | 4 | 2 | 46 | 365 | 0.0 | 87 | 0.059 |

In the units of the table, "/t" means per tonne of tapped molten iron.

* Preheating process was performed at the same time as the heating process.

As can be seen in Table 1, the time required for the melting and heating processes was significantly reduced in the Example compared to the Comparative examples 1 and 2, leading to a reduction in the time required for the entire manufacturing process and a reduction in electric power consumption rate. The electric power consumption rate was 385 kWh/t for Comparative example 1 and 380 kWh/t for Comparative example 2, whereas the Example enabled operation at a reduced electric power consumption rate of 365 kWh/t (here, t means a tonne of tapped molten iron).

This reduction in the electric power consumption rate according to the Example is mainly attributable to the use of the video device that enabled the cold iron source supporter to be properly controlled to ensure that collapse and run off of the cold iron source during the heating process was prevented and that the unintended addition of the cold iron source in the molten iron during heating was completely suppressed, thereby greatly shortening the heating process. The noise level was also lower according to the Example, which may be attributed to the better stabilization of slag forming and improved melting efficiency. Further, during the melting process, the use of an additional video device installed to the side wall of the first preheating chamber 3*a* allowed the fill height of the cold iron source in the preheating chamber 3 to be checked and maintained within a certain range in a timely manner, which is presumably a cause of increased cold iron source heating efficiency via the exhaust gas and increased melting efficiency.

Further, carbon concentration of the molten iron was 0.055 mass % according to Comparative example 1 and 0.057 mass % according to Comparative example 2, whereas according to the Example it was 0.059 mass %, which is a value closer to that of the target of 0.060 mass %, meaning that easier and more accurate control of the carbon concentration of the molten iron became possible. The lower carbon concentration in the Comparative examples is presumably due to the cold iron source 15 being mixed into the molten iron 16 during heating, which reduced the heating efficiency.

INDUSTRIAL APPLICABILITY

According to the present disclosure, molten iron production with high energy use efficiency is possible due to improvement in molten iron heating efficiency.

REFERENCE SIGNS LIST

1 Electric furnace
2 Melting chamber
3 Preheating chamber
3*a* First preheating chamber
3*b* Second preheating chamber
4 Furnace wall
5 Furnace lid
6 Electrodes
7 Oxygen blowing lance
8 Carbon material blowing lance
9 Burner
10 Extruder (pusher)
11 Cold iron source supporter (finger)
12 Tapping port
13 Tailings outlet
14 Supply bucket
15 Cold iron source
16 Molten iron
17 Molten slag
18 Arc
19 Cold iron source supply port
20 Duct
21 Tapping door
22 Tailings door
23 Travel cart
30 Video device

The invention claimed is:

1. A method of producing molten iron using an electric furnace provided with a preheating chamber operable to preheat a cold iron source and a melting chamber operable to melt the preheated cold iron source to produce molten iron, the electric furnace being further provided with a cold iron source supporter that is openable and closable and partitions the preheating chamber into a first preheating chamber on a cold iron source introduction side and a second preheating chamber on a melting chamber side, an extruder that is operable to advance and retract along a direction from the second preheating chamber toward the melting chamber, and a video device that is installed to a side wall of the second preheating chamber and configured to observe the extruder and the second preheating chamber, the method comprising:

a melting process in which, while the cold iron source supporter is open, the cold iron source that is supplied to the preheating chamber and preheated is supplied to the melting chamber by the extruder, and melting the cold iron source supplied to the melting chamber by arc heat to produce molten iron;

a heating process of heating the molten iron in the melting chamber while the cold iron source supporter is closed and a new cold iron source is introduced into the first preheating chamber;

a preheating process in which the new cold iron source in the first preheating chamber is preheated by exhaust heat from the heating process; and a tapping process to conduct the heated molten iron out of the electric furnace, wherein, in the heating process, heating of the molten iron is started based on visual information obtained via the video device of the second preheating chamber after the cold iron source supporter is closed, wherein (i) the heating of the molten iron is started after confirmation is obtained via the video device that none of the cold iron source remains in the second preheating chamber after the cold iron source supporter is closed; or (ii) after confirmation is obtained via the video device that a portion of the cold iron source remains in the second preheating chamber after the cold iron source supporter is closed, the remaining cold iron source is supplied to the melting chamber by the extruder, and the heating of the molten iron is started after confirmation is obtained via the video device that none of the cold iron source remains in the second preheating chamber.

2. The method of producing molten iron according to claim 1 further comprises a preparation process in which the cold iron source supporter is opened to supply the new cold iron source that is preheated from the first preheating chamber to the second preheating chamber after the end of the tapping process, wherein the melting process, the heating process, the preheating process, and the tapping process are performed in sequence after the preparation process.

3. The method of producing molten iron according to claim 2 wherein, in the preparation process, the cold iron source supporter is opened while a melting chamber-side tip of the extruder is positioned at a boundary between the second preheating chamber and the melting chamber.

4. The method of producing molten iron according to claim 2 wherein, in the melting process, the heating process is performed after confirmation is obtained via the video device that a predefined amount of the cold iron source has been supplied to the melting chamber.

5. The method of producing molten iron according to claim 3 wherein, in the melting process, the heating process is performed after confirmation is obtained via the video device that a predefined amount of the cold iron source has been supplied to the melting chamber.

6. The method of producing molten iron according to claim 1 wherein, in the melting process, the heating process is performed after confirmation is obtained via the video device that a predefined amount of the cold iron source has been supplied to the melting chamber.

* * * * *